(12) United States Patent
Beeker et al.

(10) Patent No.: US 6,219,802 B1
(45) Date of Patent: Apr. 17, 2001

(54) SYSTEM FOR GENERATING TEST DATA

(75) Inventors: Scott A. Beeker, Colorad Springs;
Cornelius J. Falvey, Castle Rock;
Mark P. Mullally, La Junta, all of CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/110,547

(22) Filed: Jul. 6, 1998

(51) Int. Cl.$^7$ ........................................... G06F 11/00
(52) U.S. Cl. .................................... 714/32; 707/6
(58) Field of Search .................... 714/32, 33, 38, 714/39, 41, 42, 47, 25, 26; 707/6, 101, 103, 104, 27.1

(56) References Cited

U.S. PATENT DOCUMENTS

| | | | |
|---|---|---|---|
| 5,418,793 | * 5/1995 | Chang et al. | 371/27 |
| 5,646,949 | * 7/1997 | Bruce, Jr. et al. | 371/27 |
| 5,732,247 | * 3/1998 | Dearth et al. | 395/500 |
| 5,740,353 | * 4/1998 | Kreulen et al. | 395/183.18 |
| 5,862,319 | * 1/1999 | Galetti | 395/183.09 |
| 5,870,590 | * 2/1999 | Kita et al. | 395/500 |
| 5,905,715 | * 5/1999 | Azarmi et al. | 370/244 |
| 6,038,378 | * 3/2000 | Kita et al. | 395/163.14 |
| 6,067,639 | * 5/2000 | Rodrigues et al. | 714/38 |

OTHER PUBLICATIONS

Taleshi Sakaguchi, Test data generating Device, Japanese Abstract file, 1–1, Pub. # JP409231103A, Sep. 1997.*
Eiichi Aoki et al., Generating method of data for program test, 1–1, Japanese Abstract file, Pub. #JP358169257A, Oct. 1983.*

RT smart Sockets Manual, Reliable Interprocess Communication, Version 3.5, Talarian, 444 Castro Street, Suite 140, Mountain View, CA 94041.

RT smart Sockets API, Reliable Interprocess Communication, Version 3.5, Talarian, 444 Castro Street, Suite 140, Mountain View, CA 94041.

RT works Utilities Manual, License Manager, Utilities, Macros, RT works 3.5, Talarian, 444 Castro Street, Suite 140, Mountain View, CA 94041.

RT smart Sockets C++Class Library Manual, Version 3.5, Talarian, 444 Castro Street, Suite 140, Mountain View, CA 94041.*

RT smart Sockets Read Me First, Installation, Release Notes, Known Bugs, Demos, Version 3.5, Talarian, 444 Castro Street, Suite 140, Mountain View, CA 94041.*

RT smart Sockets API Quick Reference, Version 3.5, Talarian, 444 Castro Street, Suite 140, Mountain View, CA 94041.*

* cited by examiner

*Primary Examiner*—Nadeem Iqbal

(57) ABSTRACT

A system for generating test data (40) has a data structure definition system (42), a message creation system (46), and an execution system (44). The execution system (44) executes the message creation system (46) to create a message (48) having a record built according to the data structure definition system (42).

49 Claims, 12 Drawing Sheets

BEGIN_TREE NAME<DefinitionName> *220* *222*
    0 or more objects defined within.
    ...
    *224*
END_TREE

*226*
    BEGIN_OBJECT NAME<ObjectName> *228*
        0 or more objects, bit-fields, or fields defined within.
        ...
    *230*
END_OBJECT

*232*
        FIELD NAME<FieldName>DATATYPE<DataType>SIZE<Size>
        ENDIAN<EndianType>

*234*
        BEGIN_BITFIELD NAME<BitfieldName>PACKING<PackingType>
            0 or more Bit constructs defined within.
            ... *236*
        *238*
        END_BITFIELD

*240*
BEGIN_LIST<ListType>NAME<ListName> *242*
    0 or more objects, bit-fields, or fields defined within.
    ...
    *244*
END_LIST

FIG. 9

- FLOAT (Real Number) /300
- INT (integer of sizes 1, 2, & 4 bytes). /302
- UINT (unsigned integer of sizes 1, 2, & 4 bytes). /304
- NIBBLE (integer of 4 bits). /306
- BCD (BCD value of integer size of nibbles) /308
- IBCD (IBCD value of integer size of nibbles) /310
- TBCD (TBCD value of integer size of nibbles) /312
- STRING (ASCH string value of integer size in bytes). /314
- EBCDIC (EBCDIC string value of integer size in bytes). /316
- BIT (Bitfield values of integer size in bits). BIT fields are combined in a BITFIELD /318 structure which is packed left or right.

FIG. 11

BEGIN_DEFAULT NAME<ObjectName> /330 /332
Series of Field = Value descriptors.
END_DEFAULT /334

FIG. 12

BEGIN_MESSAGE NAME<ObjectName>[PADDING<PaddingSize>] /340
Series of Field = Value descriptors /342
END_MESSAGE /344

<ObjectName>,<ElementName> [.<SubElementName>] = [(<Cast>)]<ValueString> /346

<ObjectName>,<ElementName> [.<SubElementName>] = $<GMPP call>$ /348

<ObjectName>,<ElementName> [.<SubElementName>]
=<OPERATOR> ([<Series of Arguments for Command>]) } /350

Operator ({<ObjectName>[.<ElementName>[.<SubElementName>]]})

<ObjectName>[.<ElementName>[.<SubElementName>]] = EMBED<FileName> /352

FIG. 13

| Operators | Descriptions |
|---|---|
| SIZEOF (Object) | Returns the integer size in bytes of the passed object |
| STRLEN (Object) | Returns the string length excluding NULL termination of the value string used to satisfy a string type value. This included BCD, IBCD, TBCD, EBCDIC, and string data types. For the data types which are nibble oriented, the value returned is in nibbles. |
| POINTER (Object) | Returns the absolute byte offset to current message of the object within the binary data. |
| OFFSET (Object) | Returns the relative byte offset to current byte location of the specified object within the binary data. |
| RANGE (Object1, Object2) | Returns the integer number of bytes between Object1 and Object2. |
| PARITY_ODD (Object) | Returns the value representing odd parity for the Object. Returns a "1" if the current element has an even number of "1" bits, otherwise "0". |
| PARITY_EVEN (Object) | Returns the value representing even parity for the Object. Returns a "1" if the current element has an odd number of "1" bits, otherwise "0". |
| SUM_ONES (Object) | Returns the count of the number of binary "1" values within the Object when each byte is bit checked. |
| SUM_ZEROS (Object) | Returns the count of the number of binary "0" values within the Object when each byte is bit checked. |
| CRC_16 (Object) | Performs a CRC 16 calculation on the Object. |
| CRC_32 (Object) | Performs a CRC 32 calculation on the Object. |

FIG. 14

SYSTEM FOR GENERATING TEST DATA

FIELD OF THE INVENTION

The present invention relates generally to the field of computer systems and more particularly to a system for generating test data.

BACKGROUND OF THE INVENTION

Computer systems running complex interrelated software modules require testing as new revisions of the software modules are introduced and as problems "bugs" are discovered in existing software modules. An example of such a computer system is shown in FIG. 1. This example shows small part of a telephone network 20. In this figure, a public telephone 22 is connected to a central office—service switching point (CO/SSP) 24. The CO/SSP 24 as part of its call processing sends a call record over a signaling network 26 to a service control point (SCP) 28. The SCP 28 passes the call records on to a fraud detection system 30. When a new version of the fraud detection system 30 has been developed, it is necessary to test the new version of the fraud detection system 30 before adding it to the telephone network. This requires simulating the flow of call records that the new version of the fraud detection system has been designed to analyze. Ideally, this simulation data would be generated by the actual network elements in a laboratory setting. Often, this is not practical due to a number of reasons, including, limited funds, limited laboratory resources, staggered development cycles of dependent network elements, etc.

Test tools are often used to generate test data when the actual network elements are not available. Test tools that generate data typically are built to generate one highly specialized type of data. A typical test data generation tool is built in such a way that it contains a fixed number of test data record structures internally. These types of test tools are highly useful, but these tools can only generate a fixed set of data records that correspond to the data structures it contains. As networks evolve, data records change and new data records are added. When this happens, conventional test data generation tools need to be rewritten to contain the new data record structures. In the fast evolving world of computer networks, data requirements change often and test data generation test tools are constantly being rewritten. Constant rewrites are time consuming and expensive.

Thus there exists a need for a system of generating test data that is not tied to a fixed set of data records, is inexpensive and can efficiently generate the required test data.

SUMMARY OF THE INVENTION

A system for generating test data that overcomes these and other problems has a data structure definition system, a message creation system, and an execution system. The execution system executes the message creation system to create a message having a record built according to the data structure definition system.

The present invention efficiently and inexpensively generates virtually any required test data records. This is accomplished by building a set of test data record structures, which define the test data that will be generated, based on user input. These record structures are built, or "grown", when the invention is started. The user input is given in a specialized "language" that specifies how the user wants these structures built. This language allows the user to group the atomic elements that make up all records into the desired record structures. This language supports the creation of structures that contain complex relationships between groups of objects (objects are defined as atomic elements and groups of atomic elements). Once these record structures have been grown, the invention can generate these data records in the order and volume specified by the user.

BRIEF DESCRIPTION OF THE DRAWINGS

FIG. 9 is an example of the rules of a data definition structure file;

FIG. 11 is a list of some of the atomic data types;

FIG. 12 defines the syntax of a default file;

FIG. 13 is an example of a message input file's syntax; and

FIG. 14 is a list of some of the logical commands used in a message input file.

DETAILED DESCRIPTION OF THE DRAWINGS

The system allows the user control over external stimuli of a component under test via a defined grammar. This includes control of objects, their attributes, their relationships with other objects and limited control of the representation of the objects in the intention's databases. Each grammar rule or collection of rules activated by a user input corresponds to a particular action or set of actions concerning object creation, initialization, storage (performed by helper routines), and state change (attribute update facilitated by implementor or accessor routines). For example, all "BEGIN . . . " rules result in the creation and initialization of a complex object in the appropriate database. Furthermore, all "FIELD . . . " rules and field-value association rules result in the creation and initialization of an atomic object in the appropriate database, which is logically linked to the complex object in which it is contained. In contrast, "END . . . " rules for both the blueprint and default value implementations finalize the current object entry in the database and preparations for the next object. When the parser identifies one these rules, the appropriate implementor routine is invoked, such as the "Build Message" routine. The routine accomplishes its task of producing the desired representation of user input. This routine leans on recursion coupled with extensive interface with helper routines for such sub-tasks as value conversion, error and logging management, and database search, manipulation, and management. The message database objects and their attributes are constantly created, accessed, updated, merged, and deleted throughout an execution instance of the invention. In addition, the invention uses programs that encapsulate the necessary non-generic sub-tasks such as meta-operation management and resolution. These sub-tasks are performed by the Generic Message PreProcessor (GMPP) and filters. Since separate programs are used to perform the non-generic sub-tasks, the rest of the system has a generic quality and increased speed.

Figure 1:
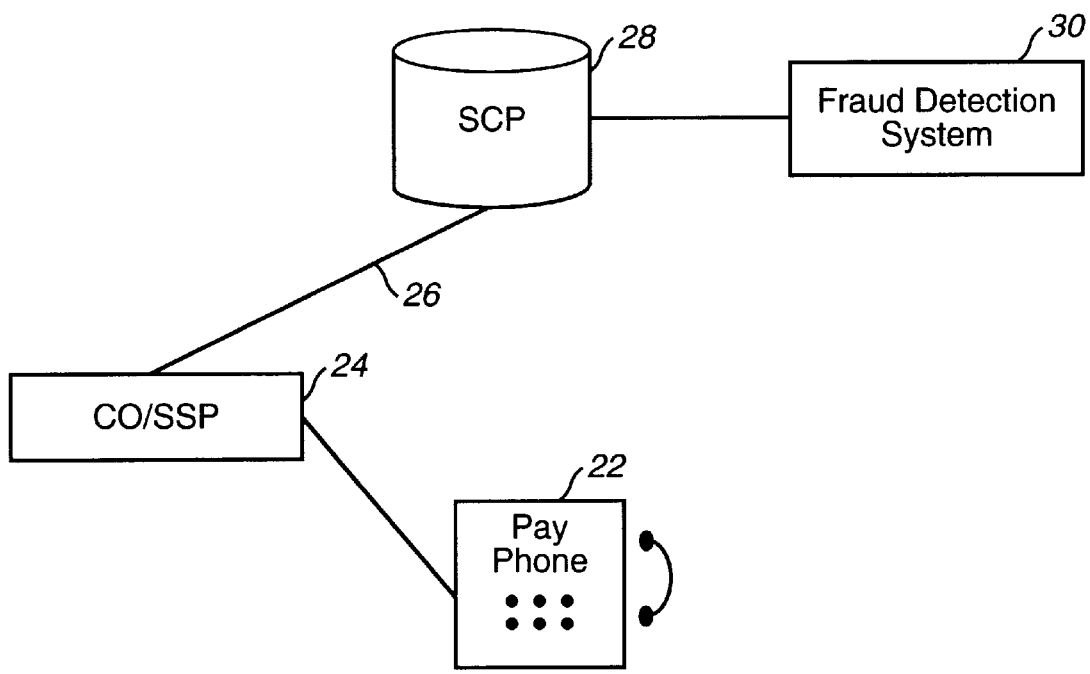
FIG. 1 is a block diagram of a telephone network having a fraud detection system.
Figure 2:
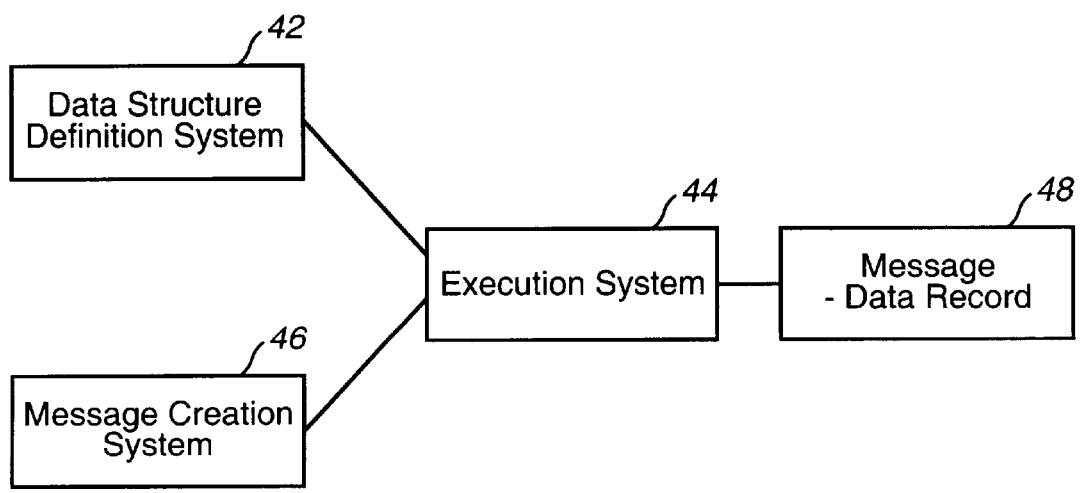
FIG. 2 is a block diagram of a system for generating test data according to one embodiment of the invention.

FIG. 2 is a block diagram of a system for generating test data 40 according to one embodiment of the invention. The system 40 includes a data structure definition system 42 connected to an execution system 44. A message creation system 46 is connected to the execution system 44. The execution system executes so as to cause the message creation system to create a message 48 having a record built according to the data structure definition system 42.

Figure 3:
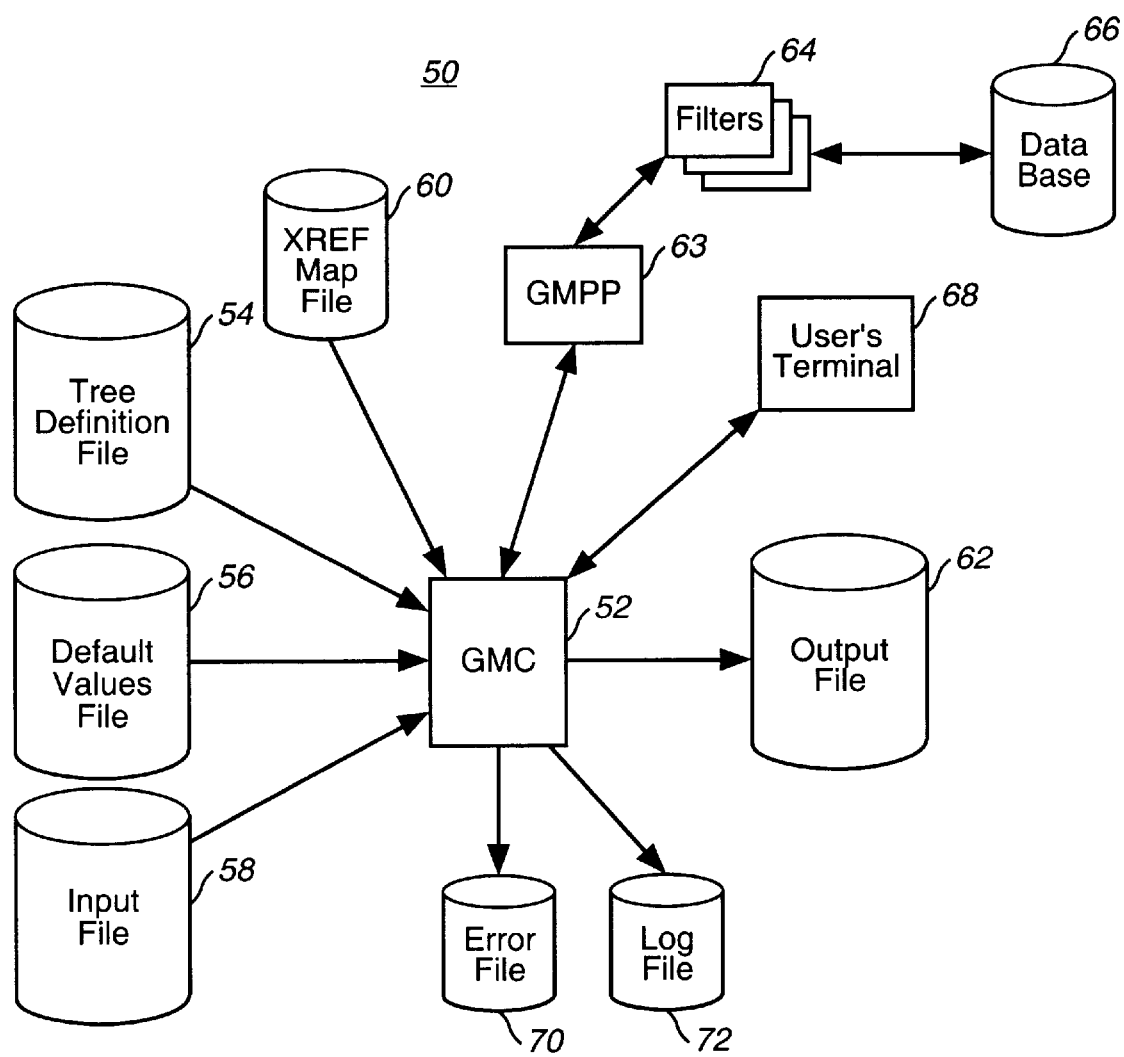
FIG. 3 is a block diagram of a system for generating test data according to another embodiment of the invention.

FIG. 3 is a block diagram of a system for generating test data 50 according to another embodiment of the invention. A Generic Message Compiler (GMC) or execution system 52 receives inputs from a tree definition file (data structure file) 54, a default values file 56 and an input file (message input file) 58. The GMC 52 processes the tree definition file 54 to build a blueprint of a record in a memory. In one embodiment, an XREF map file 60 points to several tree definition files. Next the GMC 52 processes the input file 58. The GMC 52 builds an image that is stored in an output file 62. The input file can include raw data or logical commands. Certain of the logical commands requiring mathematical functions are first processed by a Generic Message PreProcessor (GMPP) 63. The results from the GMPP 63 are then passed back to the GMC 52. The GMPP 63 in one embodiment, has calls to filters 64 for specialized processing. One of the filters 64 is a call to a data base 66. In another embodiment, the GMPP 63 has an interface for access to databases. A user's terminal 68 is used for inputting the files 54, 56, 58 and starting the execution of the GMC 52. When the GMC 52 processes an input file 58, it produces an image or output file 62, an error file 70 and a log file (information file) 72. The error file lists any errors that occur in the processing of the input or tree definition file. The log file 72 lists the execution steps of the GMC 52. In one embodiment, the input file 58 is an ASCII file and the output file 62 is a binary file. In another embodiment the GMC 52 uses the UNIX lexical analyzer (LEX) and Yet Another Compiler Compiler (YACC) to process the files.

Figure 4:
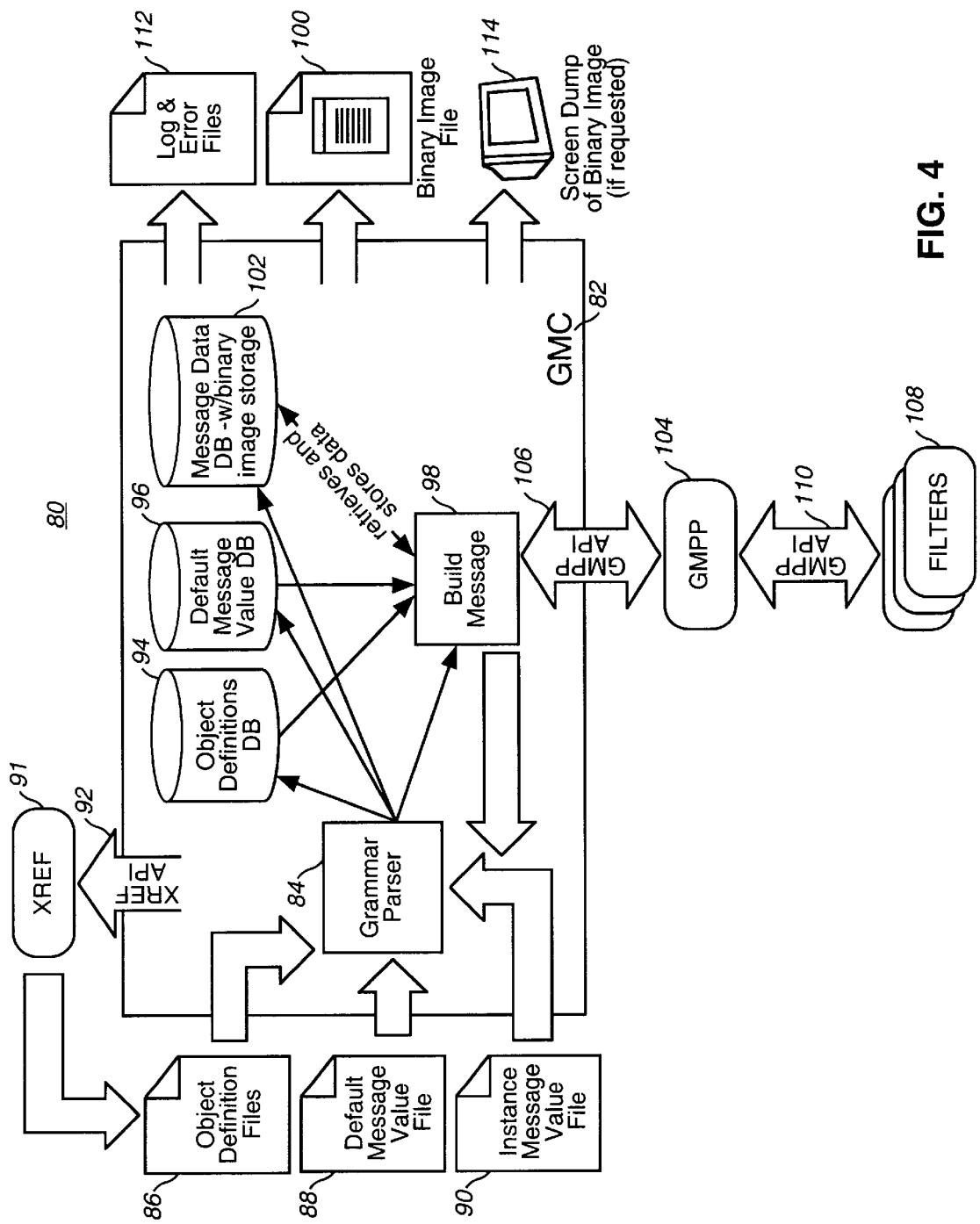
FIG. 4 is a block diagram of a system for generating test data according to another embodiment of the invention.

FIG. 4 is a block diagram of a system 80 for generating test data according to another embodiment of the invention. The GMC 82 includes a grammar parser 84 that receives inputs from the object definition files (tree definition file) 86, a default message value file (default values file) 88 and an instance message value file (input file) 90. When the grammar parser 84 starts executing the instance message value file 90, it first uses the XREF (cross reference system, cataloging system) 91 to determine the location of the object definition file. The grammar parser 84 calls the XREF 91 through a XREF API (application program interface) 92. The XREF 91 returns the object definition file 86 to the grammar parser 84 which complies the object definition file to form the blueprint that is stored in the object definition database 94. Next, the default message value file 88 is executed by the grammar parser 84 and the processed file is stored in the default message value database 96. When the grammar parser 84 begins processing the instance message value file 90, it continually loads the message data into the message database 102 until the end of a message is recognized. It then invokes the routine build message 98. Upon completion of building the message, the parser continues processing the file until another end of message is recognized. This algorithm repeats until the end of the file is recognized. The build message routine 98 is connected to the GMPP 104 by a GMPP API 106. The GMPP 104 is connected to a plurality of filters 108 by a GMPP API 110. The output of processing the instance message value file includes a binary image file 100 and a log and error file 112. A user interface 114 is used for viewing the results or entering the various input files. Using the invention it is possible to define complex data records. The message value file can define complex logical operations to define a value for a component of a data record. In addition, the invention allows the test data to be generated efficiently for a variety of different software modules.

Figure 5:
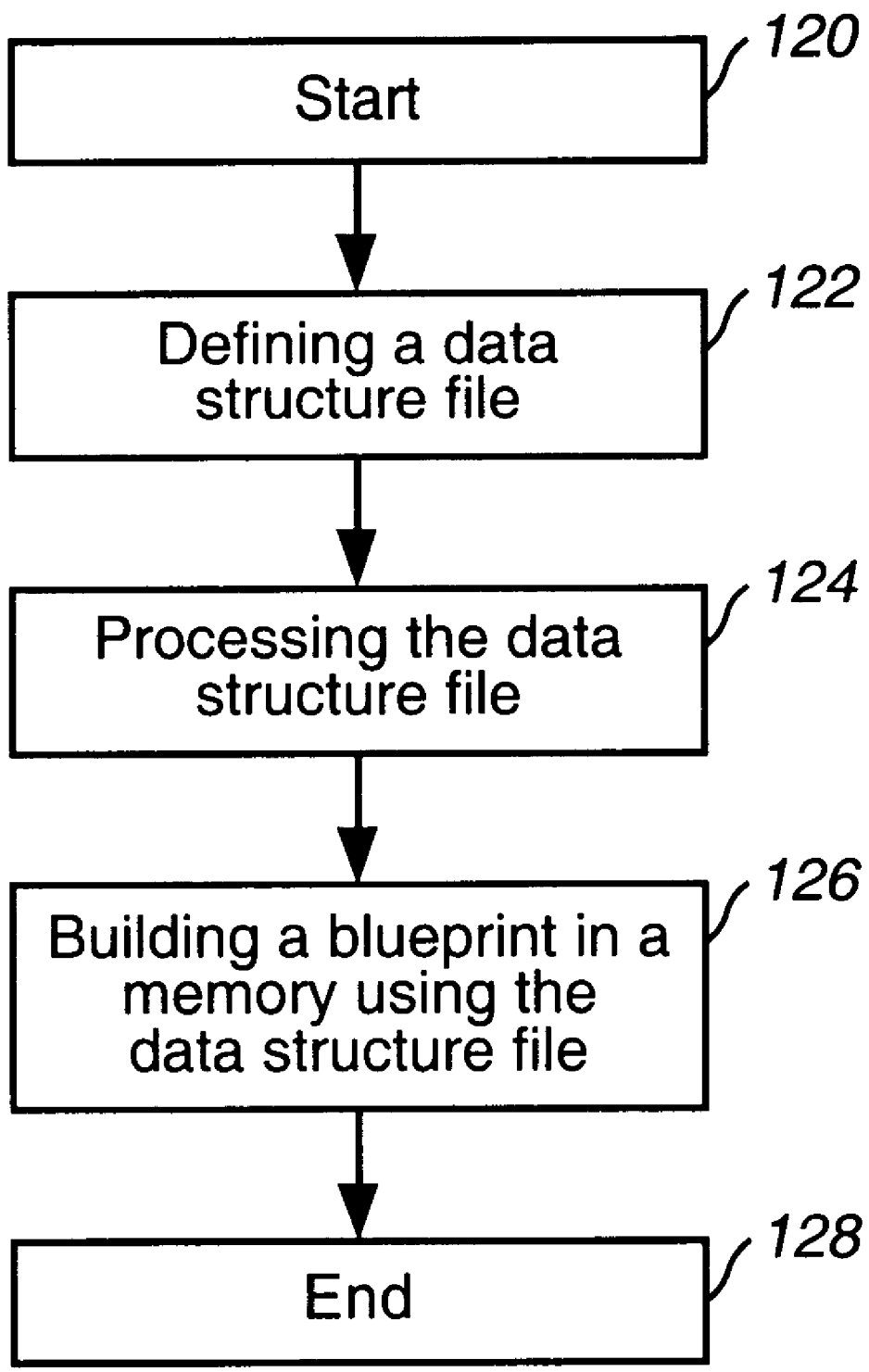
FIG. 5 is a flow chart of an embodiment of the steps used by a system for generating test data.

FIG. 5 is a flow chart of an embodiment of the steps used by a system for representing test records in memory. The process starts, step 120, by defining a data structure file at step 122. The data structure file is processed at step 124. At step 126, a blueprint is built in memory using the data structure, which ends the process at step 128. The blueprint defines the required format or structure for the test data records.

Figure 6:
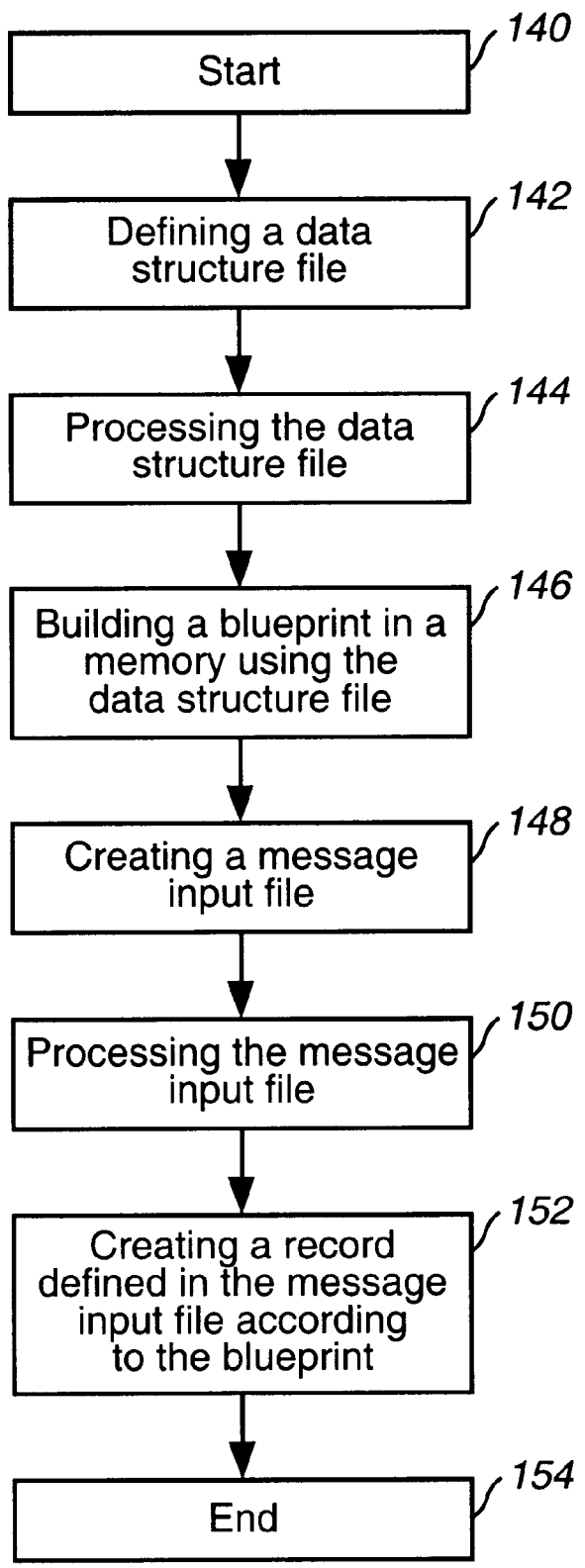
FIG. 6 is a flow chart of another embodiment of the steps used by a system for generating test data.

FIG. 6 is a flow chart of another embodiment of the steps used by a system for generating test data. The process starts, step 140, by defining a data structure file at step 142. The data structure file is processed at step 144. A blueprint is built in memory using the data structure file at step 146. Next, a message input file is created at step 148. The message input file is processed at step 150. At step 152, a record is created as defined in the message input file according to the blueprint, which ends the process at step 154. The record is one record of the test data. The message input file can be used to create multiple records of test data.

Figure 7:
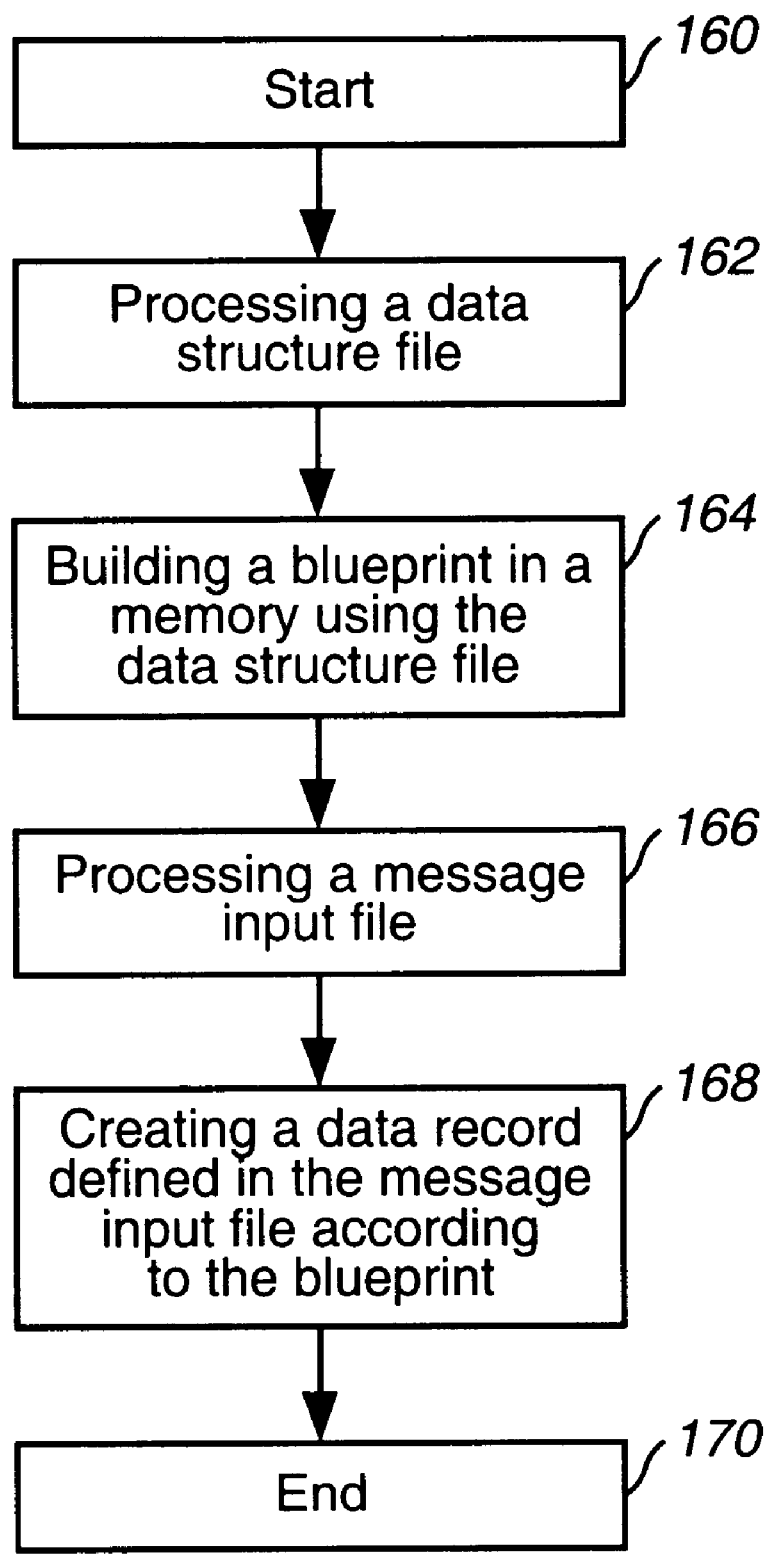
FIG. 7 is a flow chart of another embodiment of the steps used by a system for generating test data.

FIG. 7 is a flow chart of another embodiment of the steps used by a system for generating test data. The process starts, step 160, by processing a data structure file at step 162. A blueprint is built in memory using the data structure file at step 164. A message input file is processed at step 166. At step 168, a data record is created as defined by the message input file according to the blueprint, which ends the process at step 170. This process can be implemented by a computer executing a computer readable storage medium comprising computer readable instructions.

Figure 8:
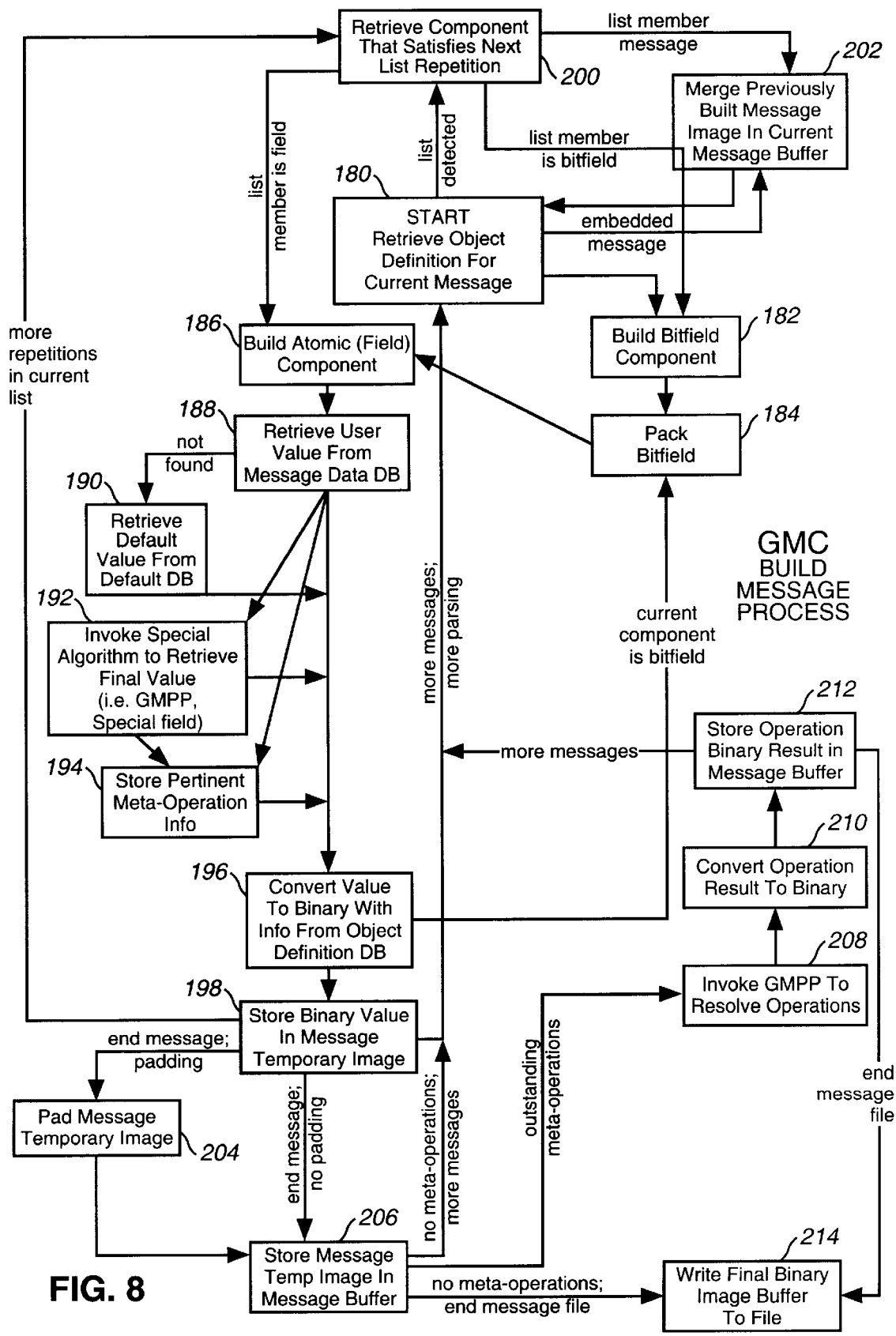
FIG. 8 is a flow chart of another embodiment of the steps used by a system for generating test data.

FIG. 8 is a flow chart of another embodiment of the steps used by a system for generating test data. This flow chart describes the process used by the system shown in FIG. 4. The process starts by retrieving an object definition for the current message at step 180. When the current message defines a bitfield, a bitfield is built at step 182. The bitfield is packed at step 184. A bitfield contains one or more atomic components. Thus processing continues at step 186. When the current message defines an atomic component the field is built at step 186. Next, the value definition for the field is retrieved from the message database at step 188. When no value definition is found, a default value is retrieved from the default value database at step 190. When special processing is required by the value definition, an algorithm is invoked to retrieve the final value at step 192. Examples of special processing include a value definition that requires the GMPP or is a special field. The algorithm stores pertinent meta-operation information at step 194. When the value definition requires a meta-operation, the system stores pertinent meta-operation information at step 194. Next, the value is converted to a format compatible with the component under test at step 196, such as a machine readable format. When a bit field is being built the bit field is then packed at step 184. In one embodiment the output format is binary. The binary value (converted value) is stored in the message temporary image at step 198. When additional components exists for the current message more parsing is required and a return to step 180 is recognized. When the current message is determined to contain a previously built embedded message, this message is merged with the current message at step 202.

When the current component is a logical grouping of components into a set (list), it is satisfied at step 200. When the next component is a bit field, the process continues at step 182. When the next component is determined to be a previously built embedded message, this message is merged with the current message at step 202. The processing then returns to step 180. When the next component is a field, the process continues at step 186.

If the current message is completely built (no additional components), two options are possible. One option is the temporary image is padded at step 204. Another option is no padding is required, and a temporary image is stored in the message buffer at step 206. When no meta-operations require resolution and more messages require processing, the process returns to step 180. When no meta-operations require resolution and the end of the message file is detected, the final binary image is written to file at step 214. When meta-operation are outstanding, the GMPP is invoked to resolve the meta-operations at step 208. Next, the result of the meta-operations are converted to binary (machine readable format) at step 210. The binary result is stored in the message buffer at step 212. When more messages need processing, the process returns to step 180. When no meta-operations are outstanding and an end message file is detected or no more messages need processing, the final binary image is written to a file at step 214.

FIG. 9 is an example of the rules of a data definition structure file. The data definition structure file is written in a defined data structure definition language (computer language) having a plurality of data structure definition commands. The first line 220 defines the name of the tree file. The second line 222 states that zero, one or many objects can be defined within a tree. Line 224 defines the end of the tree file. Line 226 defines the beginning of an object and its name. An object can include of zero, one or many objects, or bitfields or fields as shown at line 228. Line 230 defines the end of an object. Line 232 shows an example definition for a field and defines the field name, datatype, size (datasize) and endian type (bit order) for the field. Line 234 shows an example definition for the beginning of a bitfield and defines the bitfield name and packing type. As shown in line 236, the bitfield can include of zero or more bit constructs. Note that bit constructs have the same format as a field shown at line 232. Line 238 defines the end of a bitfield. Line 240 defines the beginning of a list operation and defines the list type and the list name. A list is a logical connection between components, such as objects, bitfield or fields as described in line 242. Line 244 describes the end of the list operation.

Figure 10:
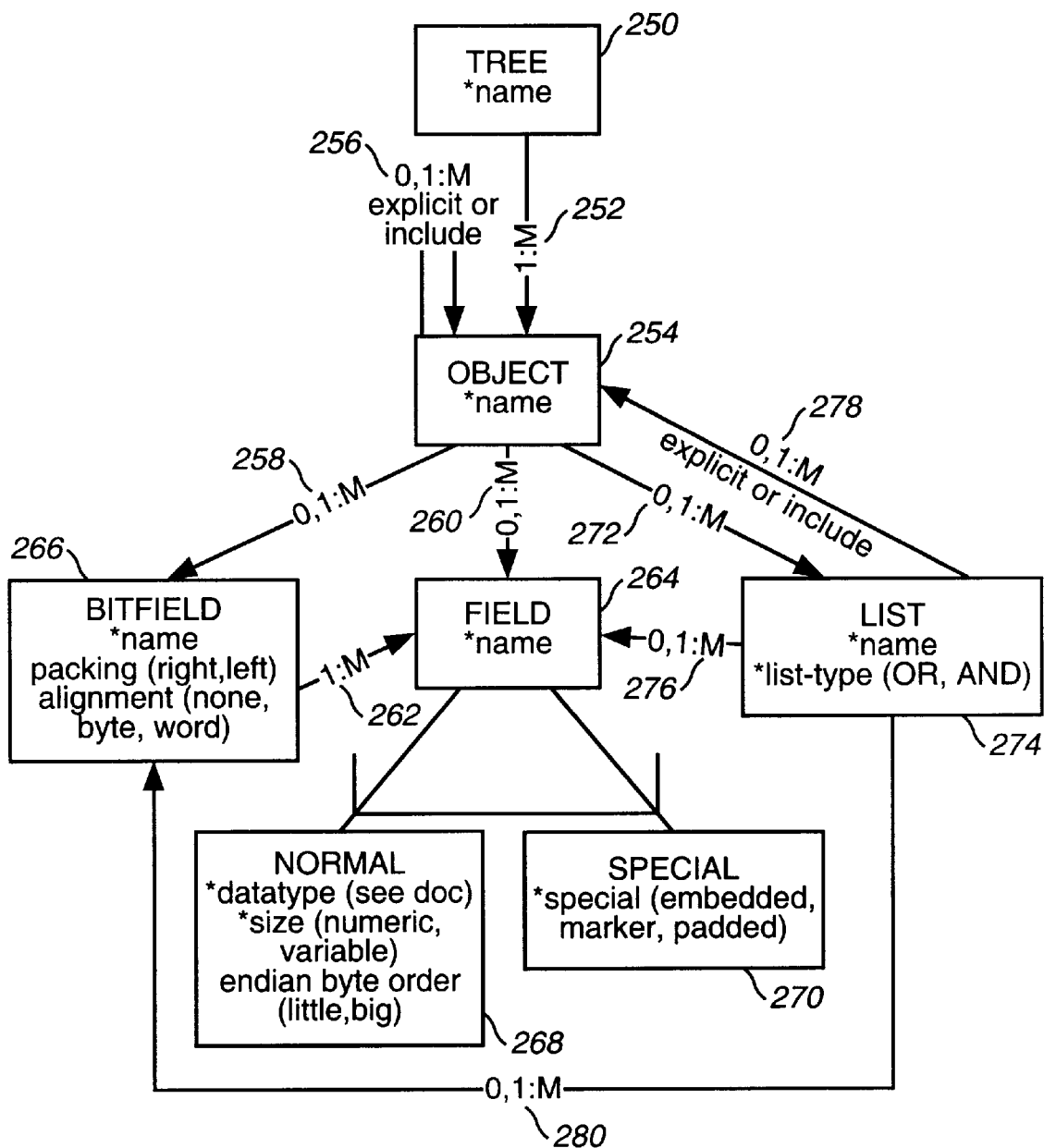
FIG. 10 is a schematic diagram defining the relationship between the elements that are used to store data definitions in memory.

FIG. 10 is a schematic diagram defining the relationship between the elements that are used to store data definitions in memory. Through the data definition file language, each element can be configured by the user to create the desired data. A data definition file (data definition structure file) has a command that defines tree name as shown in box 250. A tree file comprises one or more (1:M) 252 objects 254. Each object can include zero, one or many (0,1:M) 256 other objects 254. A begin object command defines a name of the object 254. An object 254 can include zero, one or many 258 bitfields 260. A bitfield 260 definition contains its name, the type of bit order (packing) and alignment. A bitfield 260 can include one or many 262 fields 264. In addition an object 254 can include zero, one or many 266 regular fields 264. An atomic field 264 has a name and can be normal 268 or special 270. A normal field 268 defines a datatype, size and endian byte order. A special field 270 can be embedded, padded or a marker. An embedded special field includes other data. A padded special field (pad) defines the padding for a record. A marker special field is used to hold a value related to the record but that does not appear in the image file. An object 254 can include zero, one or many 272 lists 274. A list 274 defines a logical grouping (list type, e.g., OR, AND) between zero, one or many 276 fields 264, between zero, one or many 280 bit fields 260 or between zero, one or many 278 objects 254 into a set.

FIG. 11 is a list of some of the atomic data types. A data type is used to define an atomic field. One data type is FLOAT 300 that defines the field as a real number. Another data type is INT 302 that defines the field as an integer. Another data type is UINT 304 that defines the field as an unsigned integer. Another data type is NIBBLE 306 that defines the field as a four bit integer. Another data type is BCD 308 that defines the field as a binary coded decimal value of integer size in nibbles. Another data type is IBCD 310 that defines the field as an inverted binary coded decimal value of integer size in nibbles. Another data type is TBCD 312 that defines the field as a telephone binary coded decimal value of integer size in nibbles. Another data type is STRING 314 that defines the field as an ASCII string value of the integer size in bytes. Another data type is EBCDIC 316 that defines the field as an EBCDIC (Extended Binary Coded Decimal Interchange Code) string value of integer size in bytes. Another data type is BIT 318 that defines the field as a bitfield value of integer size in bits.

FIG. 12 defines the syntax of a default file. Line 330 defines the default file's object name. The default file includes a series of fields and their value descriptors, line 332. The end of the default value file is defined in line 334.

FIG. 13 is an example of a message input file's syntax. Message input files are written in a defined data input language (programming language) that has a plurality of data input commands. Line 340 defines the beginning of a request to build a record. The beginning specifies an object name and any padding required. A series of fields and value descriptors then follow, line 342. These lines specify by name the values to place in the record's fields. If a field's value is not specified here, the default value for that field will be used. Examples of the value descriptors are shown below. The end message command is shown in line 344. One value descriptor is shown in line 346. An individual field is specified through its object name, element name and optional subelement name and is set equal to a value string. A value string would be a number or word. Another value descriptor is shown in line 348. Here an individual field is specified through its object/element/sub-element and is set equal to a meta-operation. The meta-operation can be mathematical operation, logical operation, series of logical operations or a filter call (filter operation). A meta-operation requires a call to the GMPP. Another value descriptor is shown in line 350. In this example, a field is set equal to an operator having a series of arguments for command. The series of arguments is an operation on an object/element. Another value descriptor is shown in line 352. In this example, an object/element is set equal to the contents of a file. FIG. 14 is a list of some of the operators.

Using the system and methods described herein, complex sets of test data can be created for use by a wide variety software systems. Product users are allowed to define the data types they wish to create and to create data records in any volume and order they wish without additional development/modification to this product. Changes to test data easily can be made by modifying the data definition files, default values fields and message input files. In addition, once basic data record types have been defined by the user, theses basic definitions can be used to build more complex records through an object oriented approach to data construction. Finally, the test data can be generated efficiently and inexpensively.

The methods described herein can be implemented as computer-readable instructions stored on a computer-readable storage medium that, when executed by a computer, will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for generating test data comprising:
   a data structure definition system;
   a message creation system; and
   an execution system executing the message creation system to create a message having a record built according to the data structure definition system.
2. The system of claim 1, further including a default value file that is processed by the execution system and is used in creating the message.
3. The system of claim 1, wherein the data definition system includes an object.
4. The system of claim 3, wherein the object includes a field.
5. The system of claim 4, wherein the field includes a field name and a data type and a data size.
6. The system of claim 5, wherein the field further includes a bit order.
7. The system of claim 3, wherein the object includes a bit field.
8. The system of claim 3, further including a logical grouping of a component into a set.
9. The system of claim 2, wherein the default value file includes a field and a value associated with the field.
10. The system of claim 1, wherein the message creation system includes a field name and a value associated with the field name.
11. The system of claim 1, wherein the message creation systems includes a field name and a value string associated with the field name.
12. The system of claim 10, wherein the value string is a series of logical commands.
13. The system of claim 12, wherein the series of logical commands includes a mathematical operation.
14. The system of claim 12, wherein the series of logical commands includes a filter operation.
15. The system of claim 3, wherein the object includes a special field.
16. The system of claim 15, wherein the special field is an embedded field.
17. The system of claim 15, wherein the special field is a marker.
18. The system of claim 15, wherein the special field is a pad.
19. The system of claim 1, wherein the message is in a machine readable format.
20. The system of claim 1, wherein the execution system further creates an information file.
21. The system of claim 1, further including a cataloging system for the data definition system.
22. A method of creating test data comprising the steps of:
   (a) defining a data structure file;
   (b) processing the data structure file by an execution system; and
   (c) building a blueprint in a memory using the data structure file.
23. The method of claim 22, wherein step (a) further includes the step of:
   (a1) defining an object.
24. The method of claim 23, wherein step (a1) further includes the step of:
   (i) specifying a field.
25. The method of claim 24, further including the steps of:
   (ii) specifying a field name, a data type and a data size.
26. The method of claim 24, wherein step (i) further includes specifying a bit field.
27. The method of claim 22, wherein step (a) further includes the step of:
   (a1) specifying a logical grouping of a component into a set.
28. The method of claim 22, further including the steps of:
   (d) creating a message input file;
   (e) processing the message input file;
   (f) creating a data record defined in the message input file according to the blueprint.
29. The method of claim 22, wherein step (a) further includes defining a plurality of data structure files.
30. The method of claim 29, wherein step (a) further includes cataloging the plurality of data structure files.
31. The method of claim 28, wherein step (d) further includes creating a default values file.
32. The method of claim 31, wherein step (e) further includes processing the default values file.
33. The method of claim 31, wherein the step of creating the default values file includes the step of:
   (i) specifying a field and a value associated with the field.
34. The method of claim 28, wherein step (d) further includes the step of:
   (d1) specifying a field and a value associated with the field.
35. The method of claim 28, wherein step (d) further includes the step of:
   (d1) specifying a field and a value string associated with the field.
36. The method of claim 35, wherein the step of specifying the value string includes specifying a logical command.
37. The method of claim 36, wherein the step of specifying the logical command includes specifying a mathematical operation.
38. The method of claim 36, wherein the step of specifying the logical command includes specifying a filter operation.
39. The method of claim 35, wherein the step of specifying the value string includes a call to a database.
40. A programming language for creating test data comprising:
   a data structure definition language to prepare a machine readable format of a record of the test data, the data structure definition language comprising a plurality of data structure definition commands; and an execution system designed to process each of the plurality of data structure definition commands.

41. The programming language of claim 40, wherein the plurality of data structure commands includes an object definition.

42. The programming language of claim 41, wherein the object definition includes a field definition.

43. The programming language of claim 42, wherein the field definition includes a field name, a data size and a data type.

44. The programming language of claim 42, wherein one of the plurality of data structure commands is a logical grouping command.

45. The programming language of claim 40, further including a data input language having a plurality of data input commands, the execution system is designed to process each of the plurality of data input commands.

46. The programming language of claim 45, wherein the plurality of data input commands includes a value string associated with a field.

47. The programming language of claim 46, wherein the value string is a logical command.

48. The programming language of claim 46, wherein the value string is a call to a database.

49. A computer readable storage medium comprising a plurality of computer readable instructions that when executed by a computer performs the following steps:
  (a) processing a data structure file by an execution system;
  (b) building a blueprint in a memory using the data structure file;
  (c) processing a message input file using the execution system; and
  (d) creating a record defined in the message input file according to the blueprint.

* * * * *